March 13, 1934.  A. O. FISCHER  1,950,843
THERMOSTATICALLY CONTROLLED LATCH
Filed Sept. 17, 1932
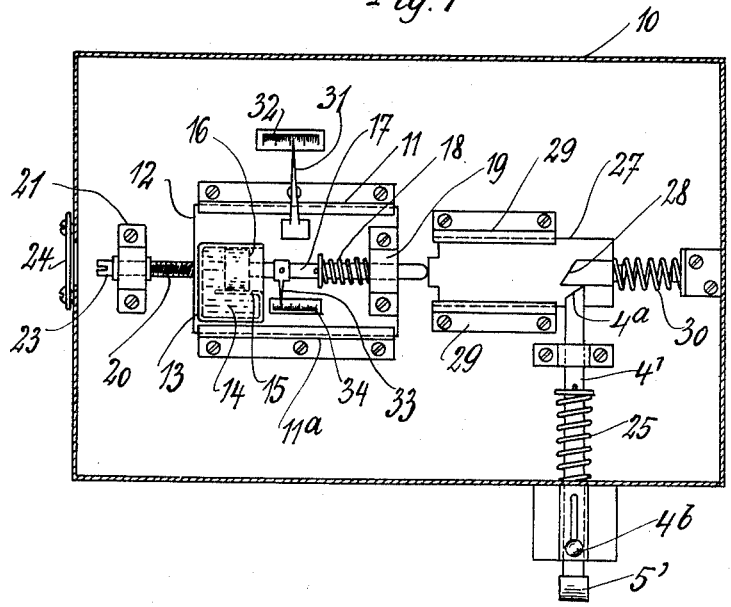
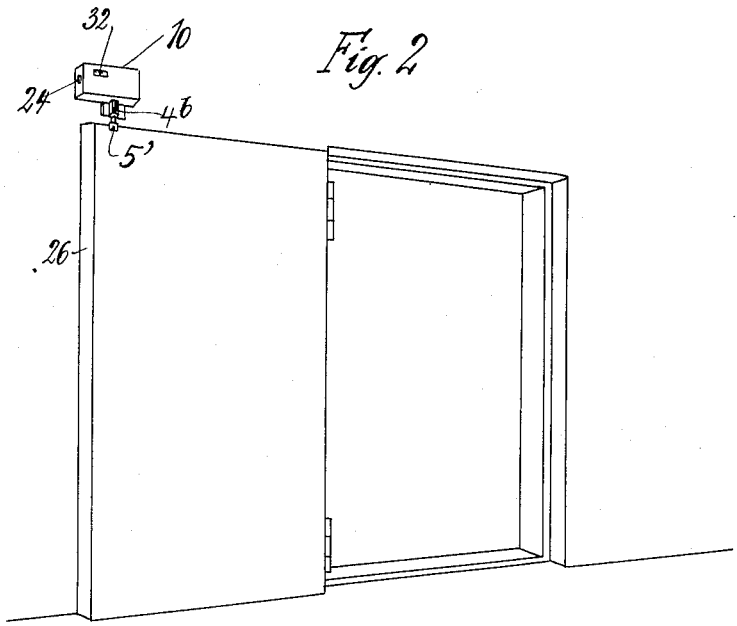
Inventor:
Alexander Otto Fischer Patented Mar. 13, 1934

1,950,843

UNITED STATES PATENT OFFICE 1,950,843

THERMOSTATICALLY CONTROLLED LATCH

Alexander Otto Fischer, Bremen, Germany

Application September 17, 1932, Serial No. 633,628
In Germany June 26, 1931

3 Claims. (Cl. 189—45)

The object of the present invention is to provide improved thermostatically operated means for releasing a latch or the like whereby a door, a fire screen, a signalling device, a fire extinguisher or the like is controlled, on the surrounding temperature rising to a predetermined degree.

According to the invention the thermostatic element is made to act on a spring-controlled slide which is adapted, by direct contact with a spring pressed latch, to maintain the latter in tensioned position, means being provided for varying the position of the thermostatic element and of the slide relative to the latch. By this arrangement a device is obtained which is of very simple construction, easily adjustable, and reliable in its operation.

Fig. 1 of the accompanying drawing represents a view of a device according to the invention, and Fig. 2 shows the device in use for the control of an automatically closing hinged door.

The thermostatic element consists of a closed vessel 13 containing an expansible fluid 14 such as air, mercury or the like. The vessel, which may be made of copper, is supported on a plate 12 so that it will be exposed on all sides to the atmosphere. A cylinder 15 in the vessel contains a piston 16 whereon the fluid acts on expansion, and this piston carries a rod 17 which is slidably guided in a bearing 19. A spring 18 on the rod opposes the movement of the latter due to the expansion of the fluid. Arranged in guideways 29 is a slide 27 which bears, under the influence of a spring 30, against the end of the rod 17 so that it will be compelled to participate in the movement of the latter. The slide 27 carries a lug 28 against which a rod 4 normally bears under the influence of a spring 25. The rod 4 carries a latch 5 which may be used, as shown in Fig. 2, for maintaining a hinged door 26 in open position, the door being adapted to close automatically when released. On a given expansion of the fluid in the vessel 13, for instance under the influence of a fire, the slide 27 will be advanced far enough for the lug 28 to slip off the bevelled end 4a of the rod 4, and the latch 5 will then fly up and release the door.

The temperature at which the door is released may be varied according to requirements. For this purpose the plate 12 is slidably held in guides 11, 11a, and its position is controlled by an adjusting screw 20 held in a bearing 21. A pointer 31, connected to the plate 12, moves over a scale 32 whereon it indicates the temperature at which the latch will be released. Another pointer 33, connected to the rod 17, moves over a scale 34 whereon, as the pointer follows the movement of the rod, it indicates the temperature prevailing at any particular time.

The rod 4' is fitted with a knob 4b whereby it can be actuated for resetting the device after the latch has been released. The different parts of the device may be enclosed in a casing 10 provided with a closable aperture 24 for admitting a screw driver into contact with the nicked end 23 of the screw 20.

The piston 16 may be replaced by a diaphragm or an elastic metal or like box.

I claim:

1. The combination with a spring-controlled latch of a slide normally maintaining said latch in tensioned position, a spring controlling said slide, a rigidly supported closed vessel, an expansible fluid in said vessel, a member controlled by said fluid and arranged to bear against the slide for moving the latter in opposition to said spring on an increase in the temperature, said slide adapted to release the latch after a given movement, and means for varying the normal positions of the vessel and of the slide relative to the latch.

2. A device as claimed in claim 1 wherein the means for varying the normal positions of the vessel and of the slide comprises an adjustable plate on which the vessel is mounted, and a screw whereby the position of said plate can be adjusted.

3. The combination with a spring-controlled latch, of a slide normally maintaining said latch in tensioned position, a spring controlling said slide, a rigidly supported but adjustable plate, a closed vessel mounted on said plate, and expansible fluid in said vessel, a member controlled by said fluid and arranged to bear against the slide for moving the latter in opposition to said spring on an increase in the temperature, said slide adapted to release the latch after a given movement, means for adjusting the position of the plate in the direction of movement of the slide for causing the latch to be released at different predetermined temperatures, means associated with the plate for indicating the temperature at which the latch is to be released, and means associated with said member for indicating the actual temperature.

ALEXANDER OTTO FISCHER.